Sept. 24, 1929.　　A. FORMOSO　　1,729,069
WINDSHIELD CLEANER
Filed Jan. 3, 1927　　2 Sheets-Sheet 1
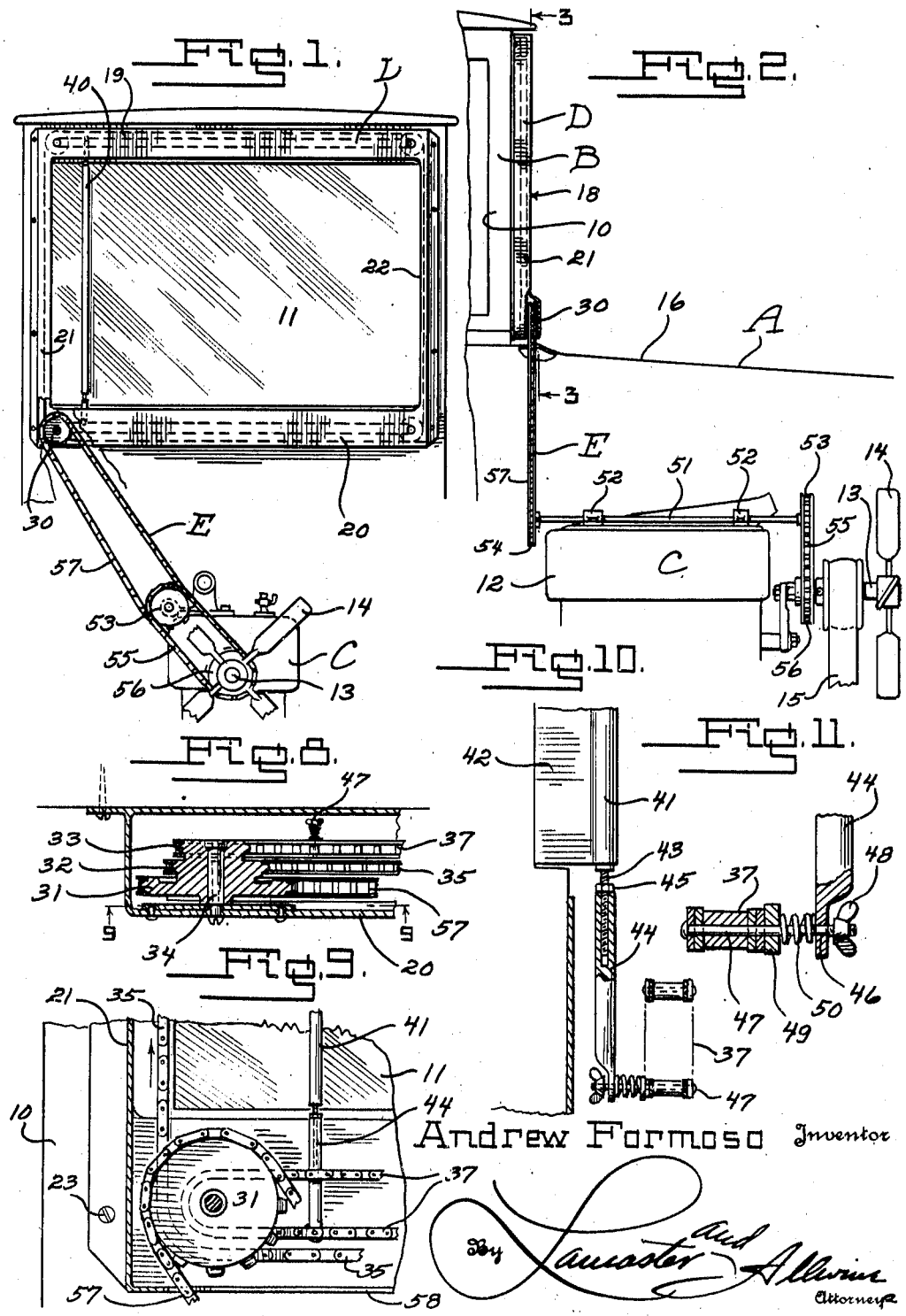

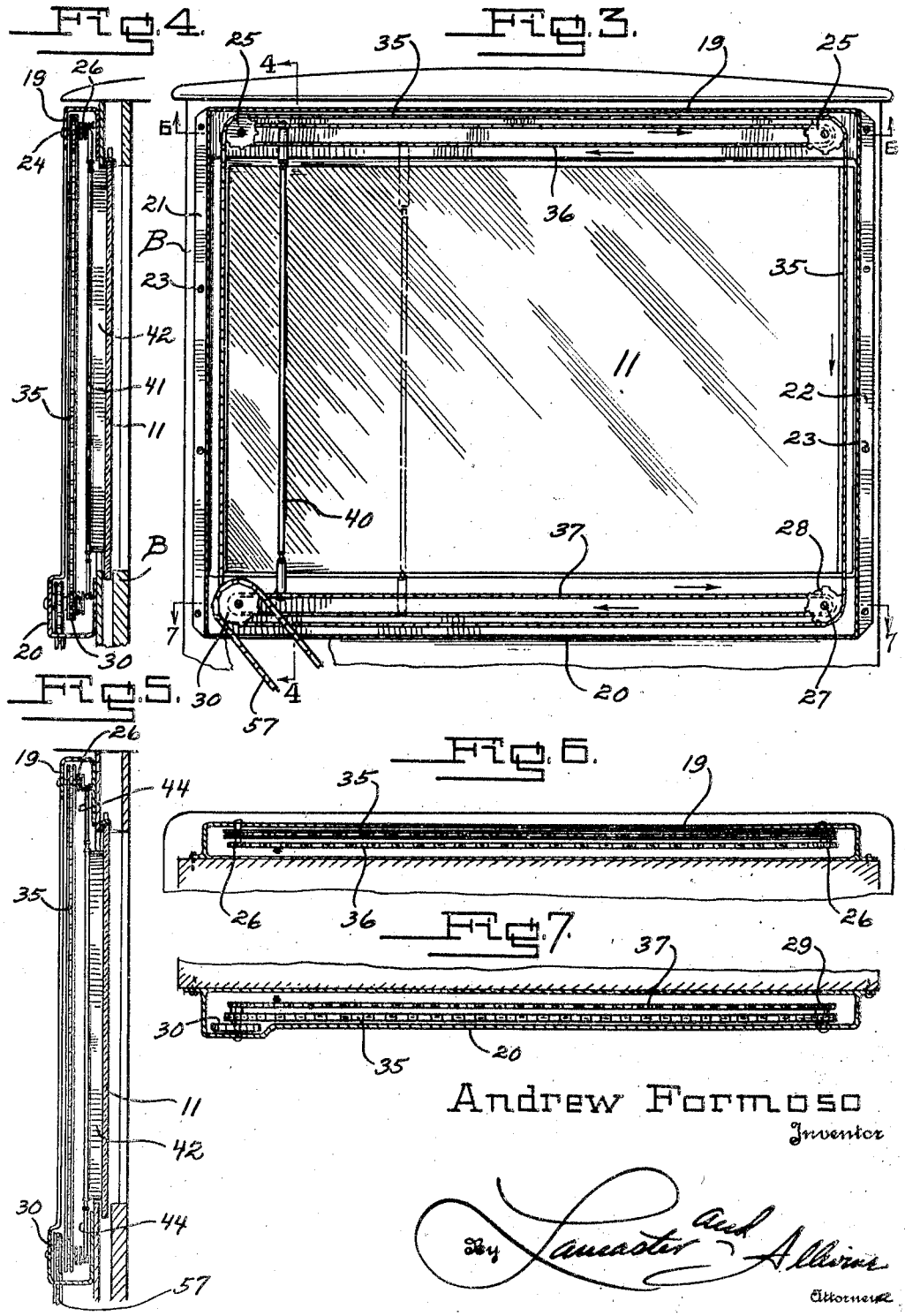

Patented Sept. 24, 1929

1,729,069

UNITED STATES PATENT OFFICE

ANDREW FORMOSO, OF NEW YORK, N. Y.

WINDSHIELD CLEANER

Application filed January 3, 1927. Serial No. 158,664.

The present invention relates to improvements in window cleaning devices, and more specifically to an improved power operated wind shield cleaner for use in cleaning the wind shields of motor vehicles.

The primary object of the invention is to provide a novel type of wind shield cleaner wherein a substantial portion of the wind shield pane is cleaned for allowing the driver of the vehicle to have a clear vision of the surface over which the vehicle is travelling.

A further object of the invention is to provide a windshield cleaner which may be mounted as a unit upon the windshield frame without detracting from the general appearance of the windshield, and which cleaner is intended to be power operated and thus allowing the driver to retain the vehicle under proper control.

A further object of the invention is to provide a novel windshield cleaner wherein the cleaner proper reciprocates transversely of the windshield and in engagement with the glass thereof during its travel in both directions.

A still further object of the invention is to provide a novel type of windshield cleaner wherein the cleaner proper is mounted to move in a reciprocatory motion across the wind shield by means of endless carriers, and which cleaner proper is caused to shift longitudinally at its limit of movement in both directions across the windshield.

A still further object of the invention resides in the provision of a windshield cleaner embodying a cleaner proper adapted to be mounted at its opposite ends upon a flexible carrier, with drive means for the carriers whereby the carriers will be caused to travel in unison for preventing one end of the cleaner proper from being moved across the windshield in advance of the opposite end of the cleaner.

A still further and important object of the invention is to provide an improved windshield cleaner which is of extremely simple and durable construction, and which is of such construction as to permit of the cleaner proper to be readily removed from the supporting frame therefor, and which supporting frame conforms in outline to the general appearance of the frame for the pane of the windshield.

Other objects and advantages of the invention will be apparent during the course of the following detailed description, taken in connection with the accompanying drawings forming a part of this specification and in which drawings:

Figure 1 is a fragmentary front plan view of a motor vehicle, showing the improved cleaner mounted thereon and illustrating one manner by which the cleaner may be operated by means of the engine for the vehicle.

Figure 2 is a fragmentary side elevation of the vehicle, showing the improved cleaner applied and operable by the engine for the vehicle.

Figure 3 is an enlarged longitudinal section through the cleaner, taken on line 3—3 of Figure 2 and looking in the direction of the arrows.

Figure 4 is a vertical section on line 4—4 of Figure 3.

Figure 5 is a vertical section taken substantially at a like location as that of Figure 4 but showing the cleaner proper in its lowered position.

Figure 6 is a horizontal section on line 6—6 of Figure 3.

Figure 7 is a horizontal section on line 7—7 of Figure 3.

Figure 8 is an enlarged fragmentary horizontal section through the lower portion of the cleaner frame, showing the special construction of the drive sprocket for the cleaner.

Figure 9 is a section on line 9—9 of Figure 8 and illustrating the manner in which the various sprocket chains are trained over the drive sprocket for the cleaner.

Figure 10 is a fragmentary detail view illustrating the manner in which the cleaner proper is mounted at its ends upon the respective endless carriers for the cleaner.

Figure 11 is a fragmentary sectional view illustrating the manner in which the cleaner proper is mounted upon the endless chain carriers.

Referring to the drawings in detail, and wherein similar reference characters designate corresponding parts throughout the several views, the letter A designates a conventional type of motor vehicle embodying the usual wind shield B and the engine C which forms the motive power for the vehicle. The letter D may designate the improved cleaner for the wind shield B, and E motion transmitting means operatively connected with the engine C for operation of the cleaner D.

The windshield B embodies the rectangular shaped casing 10 in which is mounted the glass window 11, and which window in the example shown is of one piece construction.

The engine C for the vehicle is of the ordinary type, and embodies a cylinder head 12 and a spindle 13 which projects forwardly of the engine for mounting of the usual fan 14, the spindle 13 being rotatable by means of a belt 15 which is usually trained over a pulley carried by the crank shaft of the engine. Extending forwardly from the wind shield B over the engine C, is the usual hood 16 which serves as a protecting covering for the engine.

Referring now to the improved wind shield cleaner D, the same embodies a rectangular shaped supporting frame 18 which may be formed of a suitable gauge sheet metal for providing substantially U-shaped upper and lower rails 19 and 20 respectively, and vertical end rails 21 and 22 of substantially Z shape in cross section. This open rectangular shaped frame 18 is adapted to be mounted upon the front side of the windshield casing 10 preferably by means of fastening elements 23 which are passed through the rear outwardly extending flange of the side rails 21 and 22 into the uprights of the casing. As will be observed, when the frame 18 is mounted upon the windshield casing 10, the window 11 is arranged at the sight opening through the frame 18. The upper and lower U or channel shaped rails 19 and 20 respectively open inwardly of the frame 18 for providing inwardly opening pockets at the upper and lower portions of the frame, while the inwardly extending forward flanges of the side rails 21 and 22 provide pockets at each end of the frame.

Mounted for free rotation adjacent each end of the upper channel shaped rail 19, as by means of horizontally disposed pins 24 mounted in the forward flange of the rail, are double sprockets each embodying a feed sprocket 25 and a smaller carrier sprocket 26 which is arranged rearwardly or behind the feed sprocket 25. As will be observed in Figures 4 and 6, the smaller or carrier sprockets 26 are disposed in spaced relation from the rear flange of the rail 19. Mounted for free rotation at one end of the lower rail 20, as upon a suitable pin 27 carried by the front or outer flange of the rail, is a double sprocket embodying an outer feed sprocket 28 and a smaller carrier sprocket 29 and which sprocket 29 as will be observed in Figure 7 is spaced from the rear flange of the rail 20. Each of the feed sprockets 25 and 28 are of identical construction, and likewise the carrier sprockets 26 and 29, and as will be observed each are mounted in a like position within the frame 18.

Mounted at the opposite end of the lower rail 20 from that end at which the sprocket 28 is mounted, is a triple sprocket 30 provided with a drive sprocket 31, a feed sprocket 32, and a carrier sprocket 33. This triple sprocket 30 is rotatably mounted upon a spindle 34 carried by the outer flange of the rail 20 with the carrier sprocket 33 disposed rearmost and in spaced relation from the rear flange of the lower rail as clearly illustrated in Figure 8.

Trained over the feed sprockets 25, 28 and 32, is an endless sprocket chain 35 and which in the example shown may move in the direction of the arrow as indicated in Figures 3 and 9. As will be observed in Figure 3, this endless sprocket chain 35 travels in the inwardly opening pocket formed by the rails of the frame 18, and since each of the feed sprockets 25, 28 and 32 are of a like diameter, these sprockets will all rotate at a like speed.

Trained over the carrier sprockets 26 and disposed wholly within the channel like upper rail 19, is an endless carrier chain 36 and which chain may travel in a direction as indicated by the arrow in Figure 3. Thus it will be seen that with the feed chain 35 moving in a direction as indicated, that the upper section of the carrier chain 36 will be moving in a direction toward the right of the vehicle or toward the side rail 22.

Trained over the lower set of carrier sprockets 29 and 33, and which are arranged a like distance apart as that of the carrier sprockets 26, is an endless lower carrier chain 37 and which will be caused to travel in a like direction as that of the upper carrier chain 36 upon travel of the feed chain 35 in a clockwise direction. This lower carrier chain 37 and which is disposed wholly within the channel shaped lower rail 20 extends parallel with and directly below the upper carrier chain 36. As will be observed in Figure 3, the upper sections of each of the endless carrier chains 36 and 37 move in a like direction toward the side rail 22.

Mounted for wiping engagement with the window 11, is a cleaner proper 40, and which cleaner 40 is intended to be moved transversely back and forth across the window by means of the carrier chains 36 and 37. This cleaner proper 40 embodies a back 41 which is of a length slightly less than the distance between the upper and lower rails 19 and 20, and which back carries a suitable squeegee 42 which is intended to yieldably engage the window 11 for cleaning thereof as the cleaner proper is reciprocated horizontally across the window. Carried by the upper and lower ends of the back 41, are threaded studs 43 which are adapted for threaded engagement in suitable heads 44, and threaded upon each of the studs 43 is an adjusting lock nut 45 which may be turned into binding engagement with the adjacent ends of the heads 44. The terminal portion of each of the heads 44 is flattened and provided with an aperture 46 for receiving a pin 47, and which pin constitutes one of the hinge pins for the carrier chains. These pins 47 project for a substantial distance past the rear edge of their respective carrier chains and are preferably threaded at their rear ends for receiving a retaining wing nut 48 which serves for preventing movement of the head 44 off their respective carrier pins 47. A washer 49 is mounted upon each of the pins 47 to the rear of their respective carrier chains, and an expansion spring 50 encircles each pin 47 between the washer 49 and head 44 in a manner for normally urging the squeegee 42 toward the window 11 as illustrated in Figure 10. The washers 49 aside from forming an abutment for the springs 50, further serve for retaining the terminals of the heads 44 out of possible engagement with the carrier sprockets. Thus it will be seen that the cleaner proper 40 is pivotally connected at opposite ends to the respective upper and lower carrier chains 36 and 37 respectively, and that upon movement of the carrier chains, the cleaner proper will be caused to travel in a vertical position horizontally across the window 11.

Referring now to the drive means E for operation of the cleaner D, the same in the example shown, embodies a drive shaft 51 which is rotatably mounted in suitable bearings 52 longitudinally of the cylinder head 12 with the ends of the shaft projecting forwardly and rearwardly past the ends of the cylinder head and provided at its forward end with a sprocket wheel 53 and at its rear end with a sprocket wheel 54. Trained over the forward sprocket wheel 53, is a sprocket chain 55 which is connected with a sprocket wheel 56 rigidly mounted upon the rotatable fan spindle 13. Trained over the rear sprocket wheel 54, and which sprocket wheel is arranged in alignment with the drive sprocket 31 of the triple sprocket 30, is a sprocket chain 57 which extends upwardly through an opening provided in the hood 16 and through a suitable opening 58 provided in the lower web of the lower frame rail 20. Thus it will be seen that upon rotation of the spindle 13, that the triple sprocket 30 will be rotated in a clockwise direction for causing the feed chain 35 to move in a direction as indicated by the arrow in Figure 3.

While the drive means for the cleaner D have been shown as embodying a drive means operable by the engine of the vehicle, it will of course be understood that various other methods may be employed for imparting movement to the drive sprocket 31.

In operation, and with the cleaner proper 40 in a position as illustrated in full lines in Figure 3, movement imparted to the drive sprocket 31 will cause the feed chain 35 to move in a direction as indicated and which will cause the companion carrier sprockets 26 and the companion carrier sprockets 29 and 33 to be rotated in a like direction and at a like rate of speed. With the upper sections of the carrier chains 36 and 37 moving in a direction as indicated, the cleaner 40 and which is in its elevated position, will be caused to move toward the right side of the windshield until the respective pivot pins 47 reach the carrier sprockets at the right side of the windshield, and as the carrier pins 47 move about the carrier sprockets, the cleaner will be shifted longitudinally and downwardly and be returned to the left side of the windshield in a lowered position as illustrated by the dot and dash line showing in Figure 3. Thus it will be seen that the cleaner is reciprocated across the window 11 and is automatically shifted longitudinally at its limit of movement in each direction across the window.

As will be observed, this novel drive means for the cleaner eliminates the necessity of providing complicated reversing means for the cleaner proper when reaching its limit of movement across the windshield. During the horizontal moving and longitudinal shifting of the cleaner, it will be seen that the entire area of the window 11 will be thoroughly cleaned, since the squeegee 42 moves from end to end of the window, first across the uppermost portion thereof and on its return movement across the lower portion of the window.

From the foregoing description it will be apparent that an improved and novel type of windshield cleaner has been provided embodying a cleaning member which is disposed in wiping engagement with the window of the windshield during its travel in both directions across the window, and which cleaning member is intended for movement by means of carrier chains which are caused to operate in synchronism and in a manner whereby the cleaning member is caused to automatically shift longitudinally when reaching its end of travel in either direction across the window.

Various changes may be made to the specific form of the invention herein shown and described, without departing from the spirit of the invention or the scope of the following claims.

I claim:

1. A windshield cleaner comprising an open rectangular shaped frame, endless carriers mounted in opposite rails of the frame on axes at right angles to the major plane of the frame, a cleaning member having its opposite ends connected with the respective endless carriers for movement across the frame, and means for synchronous operation of the endless carriers.

2. A windshield cleaner comprising an open frame, endless carriers mounted in parallel relation in opposite rails of the frame, drive means for synchronous operation of the carriers, and a cleaner member journalled at its ends on the respective endless carriers.

3. In a windshield cleaner, a rectangular shaped supporting frame, synchronously operated endless carriers mounted in opposite rails of the frame and having parallel runs, and a cleaner member journalled at its ends in the respective endless carriers for movement in longitudinally shifted positions when moving in opposite directions across the frame.

4. In a windshield cleaner, an open supporting frame embodying upper and lower rails, endless carriers mounted horizontally and in parallel relation in the upper and lower rails, means for synchronous operation of the endless carriers with a continuous movement in one direction, and a cleaner member pivotally connected at its upper and lower ends to like runs of the respective endless carriers for movement in one direction in a longitudinally shifted position across the frame in an upper position and movement in the opposite direction across the frame in a lowered position.

5. In a windshield cleaner comprising an open supporting frame embodying upper and lower rails and side rails, a sprocket wheel mounted at each end of the upper and lower rails, an endless carrier chain trained over the sprockets of the upper rail and a second over the sprockets of the lower rail, means for synchronous rotation of the sprocket wheels, in one direction and a cleaner member pivotally mounted at its upper and lower ends upon the respective endless carriers for movement back and forth toward said side rails in contact with the pane of the windshield.

6. In a windshield cleaner comprising an open frame embodying upper and lower rails and side rails, a carrier pulley mounted at each corner of the frame with the axes for the upper set of sprockets disposed parallel with the axes of the lower set of sprockets, an endless carrier chain trained over the upper and a second over the lower set of sprockets with the flat of the chains parallel with the plane of the windshield, means for synchronous operation of said sprockets for causing the endless carrier chains to move continuously in a like direction, and a cleaner member pivotally connected at its ends to like runs of the endless carrier chains for movement back and forth across the frame between the upper and lower rails thereof.

7. A wind shield cleaner comprising an open frame embodying upper and lower rails and end rails, said upper and lower rails being of channel formation and said end rails being provided with inwardly extending flanges a cluster sprocket mounted adjacent each end of the upper rail, a cluster sprocket mounted adjacent each end of the lower rail, said sprockets mounted with their axes at a right angle to the plane of the windshield, an endless carrier chain trained over one set of teeth of the upper set of cluster sprockets and a second over one set of teeth of the lower set of cluster sprockets, an endless feed chain trained over a second set of teeth of the cluster sprockets for causing each sprocket to rotate in a like direction and at like speeds, said feed chain extending at its straight runs in said frame rails, drive means for imparting movement to the feed chain in one direction, and a cleaner member pivotally connected at opposite ends to like runs of the endless carrier chains for reciprocatory movement within the frame.

8. In a windshield cleaner embodying a frame, and endless carriers mounted in parallel relation upon the frame, a cleaner member for operation by the endless carriers comprising a back provided with a cleaning element, a head carried by each end of the back and adjustable longitudinally thereof, and a carrier pin projecting from each endless carrier for pivotal connection with the outer end of each head.

9. In a windshield cleaner, embodying carrier chains mounted in parallel relation and connected for synchronous operation, a carrier pin projecting rearwardly from each chain and each having a threaded end, a cleaner member having an adjustable head at each end thereof provided with apertures for pivotally receiving said pins, a stop threaded upon the rear end of each pin for retaining the cleaner heads on the pins, and an expansion spring encircling each pin between the cleaner heads and chain for normally urging the cleaner member away from the chain into engagement with the windshield glass.

10. In a windshield cleaner, the combination of an open rectangular shaped frame for attachment to the face side of a windshield frame, endless carrier chains mounted horizontally in the upper and lower rails of the frame with the flat of the chains parallel to the plane of the frame, drive means for imparting continuous movement to the chains, and a vertically arranged cleaner member connected at its ends to the carrier chains for reciprocatory movement across the frame.

ANDREW FORMOSO.